United States Patent [19]

Skupsky et al.

[11] Patent Number: 4,961,195
[45] Date of Patent: Oct. 2, 1990

[54] SYSTEMS FOR CONTROLLING THE INTENSITY VARIATIONS IN A LASER BEAM AND FOR FREQUENCY CONVERSION THEREOF

[75] Inventors: Stanley Skupsky; R. Stephen Craxton, both of Rochester; John Soures, Pittsford, all of N.Y.

[73] Assignee: The University of Rochester, Rochester, N.Y.

[21] Appl. No.: 228,131

[22] Filed: Aug. 3, 1988

[51] Int. Cl.$^5$ ................................................ H01S 3/13
[52] U.S. Cl. ...................................... 372/31; 307/427; 372/22
[58] Field of Search ............................ 372/31, 29, 28; 307/427

[56] References Cited

U.S. PATENT DOCUMENTS

4,346,314  8/1982  Craxton .............................. 307/427

OTHER PUBLICATIONS

Véron et al., "Optical Spatial Smoothing of Nd-Glass Laser Beam"; Optics Comm. vol. 65, No. 1, 1 Jan. 1988.
LLE Review, Quarterly Report, vol. 33, Oct.-Dec., 1987, ed., J. Kelly, pp. 1–10.
Y. Kato et al., Phys. Rev., Lett., 53, 1057 (1984).
R. H. Lehmberg et al., Opt. Commun., 46, 27 (1983).
S. P. Obenschain et al., Phys. Rev. Lett., 56, 2807 (1986).
R. H. Lehmberg et al., J. Appl. Phys., 62, 2680 (1987).
R. H. Lehmberg et al., Fusion Tech. 11, 532 (1987).
R. S. Craxton et al., IEEE J. Quantum Electron., QE-17, 1771 (1981).
R. C. Eckardt et al., IEEE J. Quantum Electron., QE-20 1178 (1984).
LL Review, Quarterly Report, vol. 25, Oct-Dec. 42, 1984, Ed. A. Schmid.
IEEE Journal of Quantum Electron, vol. QE-17, 1782, Sep. 1981, Craxton et al.
IEEE J. Quantum Electronics, QE-5, 484 (1969) E. B. Tveacy.

Primary Examiner—Leon Scott, Jr.
Attorney, Agent, or Firm—Martin Lukacher

[57] ABSTRACT

In order to control the intensity of a laser beam so that its intensity varies uniformly and provides uniform illumination of a target, such as a laser fusion target, a broad bandwidth laser pulse is spectrally dispersed spatially so that the frequency components thereof are spread apart. A disperser (grating) provides an output beam which varies spatially in wavelength in at least one direction transverse to the direction of propagation of the beam. Temporal spread (time delay) across the beam is corrected by using a phase delay device (a time delay compensation echelon). The dispersed beam may be amplified with laser amplifiers and frequency converted (doubled, tripled or quadrupled in frequency) with nonlinear optical elements (birefringent crystals). The spectral variation across the beam is compensated by varying the angle of incidence on one of the crystals with respect to the crystal optical axis utilizing a lens which diverges the beam. Another lens after the frequency converter may be used to recollimate the beam. The frequency converted beam is recombined so that portions of different frequency interfere and, unlike interference between waves of the same wavelength, there results an intensity pattern with rapid temoral oscillations which average out rapidly in time thereby producing uniform illumination on target. A distributed phase plate (also known as a random phase mask), through which the spectrally dispersed beam is passed and then focused on a target, is used to provide the interference pattern which becomes nearly modulation free and uniform in intensity in the direction of the spectral variation.

50 Claims, 8 Drawing Sheets

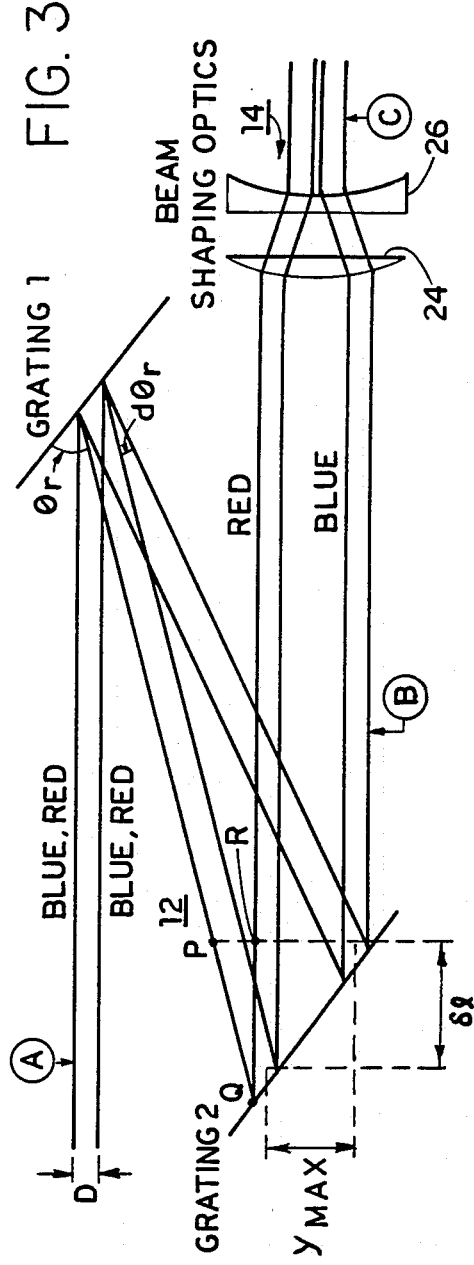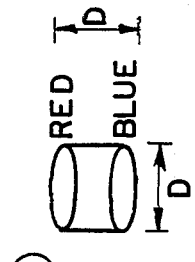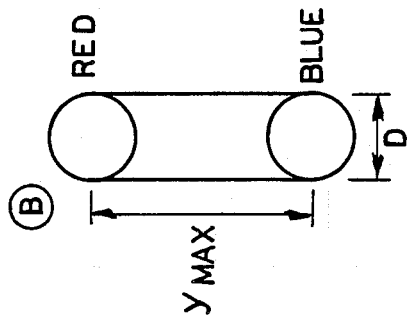
FIG. 3
FIG. 3A
FIG. 3B
FIG. 3C

TRIPLER ANGLE

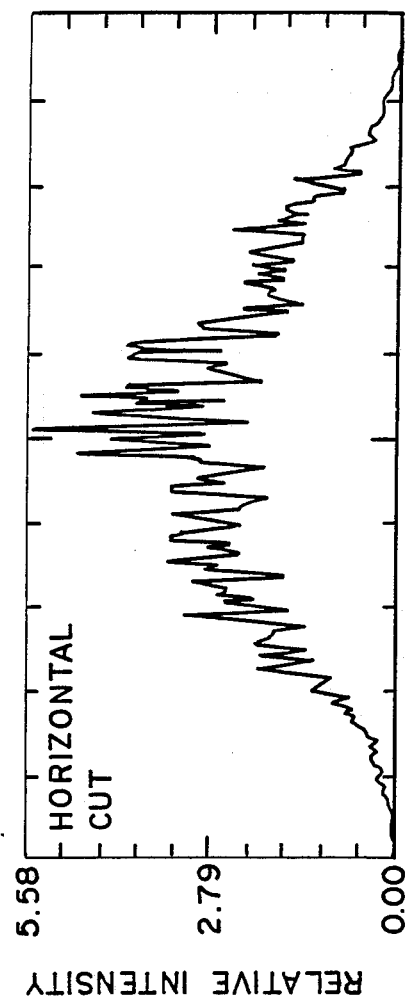
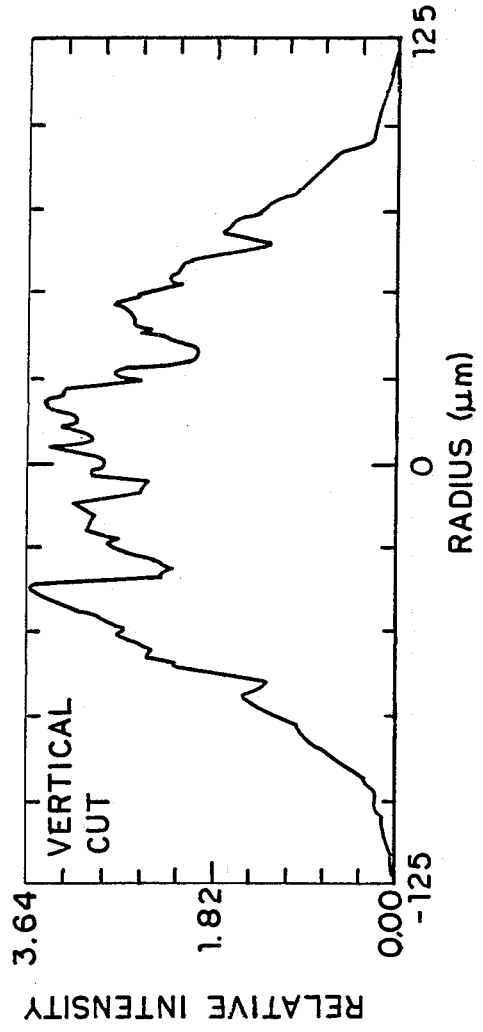

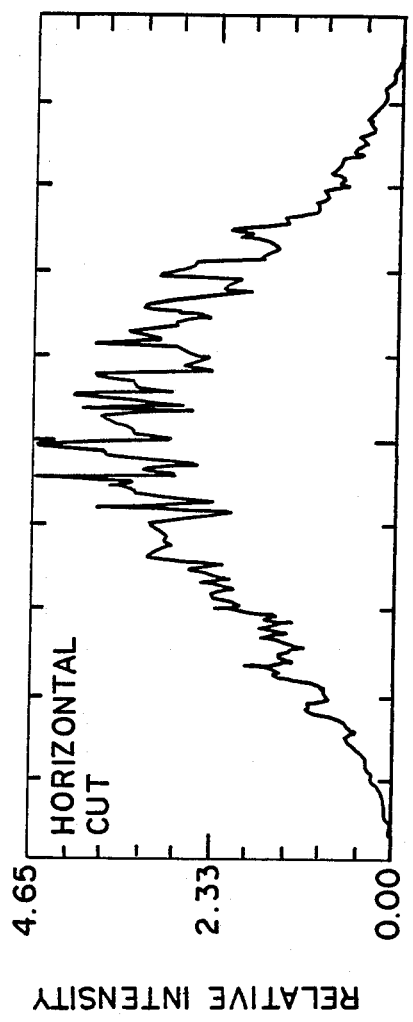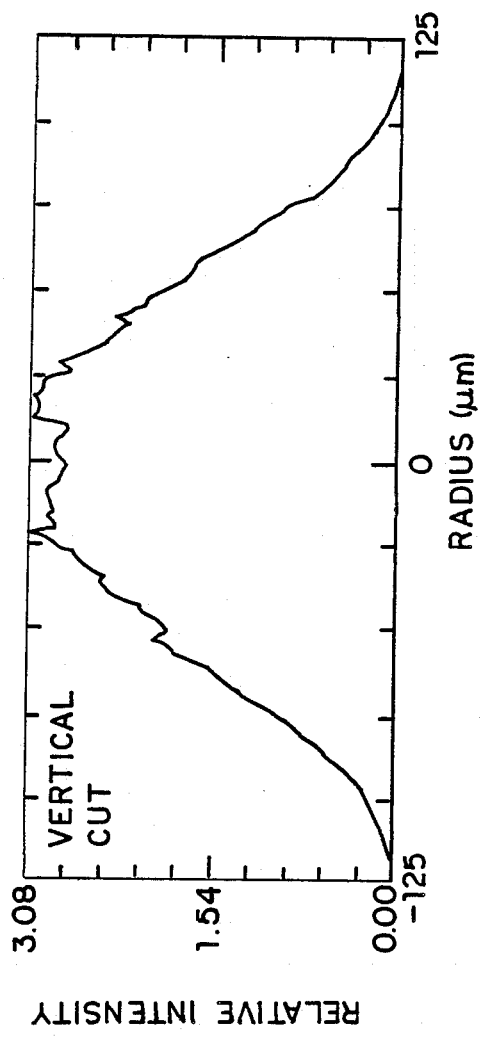
FIG. 7A
FIG. 7B

SYSTEMS FOR CONTROLLING THE INTENSITY VARIATIONS IN A LASER BEAM AND FOR FREQUENCY CONVERSION THEREOF

The United States Government has rights in this invention by virtue of an agreement with the U.S. Department of Energy, Office of Inertial Fusion, DE-FC 08-85 DP 40200.

The present invention relates to systems for controlling the intensity of laser beams and particularly to systems for temporally smoothing high power spectrally broad laser pulses while still permitting frequency conversion (e.g., doubling, tripling or quadrupling).

The invention is especially suitable for use in providing laser beams which irradiate laser fusion targets wherein uniform absorption of laser light results in high density compression and avoids the generation of hot spot intensity non-uniformities, or wherein narrow-band irradiation leads to the excitation of undesired plasma instabilities. The invention will also be found useful wherever variations in the intensity of a laser beam are not desired, for example where such variations interfere with propagation of the beam over long distances.

Distributed phase plates (DPP), which are also known as random phase masks (RPM), have been used in laser fusion systems in order to improve the uniformity of intensity of laser beams which illuminate laser fusion targets so as to reduce near-field phase and intensity errors which produce hot spots on target. Such hot spots interfere with direct drive laser fusion which requires the uniform irradiation of spherical targets by laser beams in order to obtain the high density compression needed for fusion reactions in the target.

A DPP breaks up the laser beam into a large number of beamlets whose diffraction limited size is roughly the same as the target diameter. The resulting intensity pattern on target will be a smooth envelope superimposed upon a rapidly varying interference pattern from the overlap of different beamlets. See, LLE Review, Quarterly Report, Volume 33, October-December, 1987, Ed. J. Kelly, article entitled, "OMEGA Phase Conversion with Distributed Phase Plates", pages 1–10. The DPP approach produces a static interference pattern or structure which exists for a time greater than the hydrodynamic time scale of the target (while compression is occurring). It has been theorized that this interference structure would be substantially eliminated by thermal-conduction smoothing within the target or by refraction of beamlets in the target atmosphere. See, Y. Kato et al., Phys. Rev. Lett., 53, 1057 (1984). In spite of such theories, efforts have been made to eliminate the interference structure by delaying each beamlet by one or more coherence times (the coherence time $\tau$ is defined as $\tau = 1/\Delta\nu$, where $\Delta\nu$ is the bandwidth of the laser pulse). This technique is known as Induced Spatial Incoherence (ISI) and is described in R. H. Lehmberg et al., Opt. Commun., 46, 27 (1983); S. P. Obenschain et al., Phys. Rev. Lett., 56, 2807 (1986); R. H. Lehmberg et al., J. Appl. Phys., 62, 2680 (1987). The interference pattern on target fluctuates in time and provides a smoother time averaged intensity profile than if the DPP is used alone. A spectrally broad laser pulse specifically a large number of coherence times during the time interval of interest) is required for good smoothing of the interference pattern. Other smoothing approaches also require a spectrally broad laser pulse. See, R. H. Lehmberg et al., Fusion Tech., 11, 532 (1987) and D. Veron et al., Opt. Comm., 65, 42 (1988).

High efficiency frequency tripling of the 1.054 $\mu$m laser wavelength to ultraviolet (0.35 $\mu$m) wavelengths has not heretofore been possible with the ISI technique whereby each beamlet is delayed by one or more coherence times. This is because the frequency conversion crystal which combines the fundamental 1.054 $\mu$m light can only be optimally oriented for a narrow band of wavelengths, substantially less than the broad band required by ISI. High efficiency frequency tripling is used in the OMEGA and NOVA laser fusion systems and is described in U.S. Pat. No. 4,346,314 issued Aug. 24, 1982. See also, U.S. Pat. No. 4,331,891, issued May 25, 1982 and R. S. Craxton et al., IEEE J. Quantum Electron., OE-17, 1782 (1981) and R. S. Craxton, IEEE J. Quantum Electron., OE-17, 1771 (1981) and R. C. Eckardt et al., IEEE J. Quantum Electron., QE-20, 1178 (1984).

Accordingly it is the principal object of this invention to provide a system (method and apparatus) whereby the intensity of a laser beam may be controlled so as to provide uniform illumination or irradiation in a region of interest (e.g. on a laser fusion target).

It is another object of this invention to provide a system whereby a laser beam may be modified in order to control and provide uniformity of intensity which enables the use of frequency conversion and particularly the achievement of high efficiency frequency tripling.

More particularly as regards frequency conversion, the invention has as its object the provision of a system which enables the use of spatial incoherence (as provided by DPPs) and temporal incoherence (as provided by a broadband laser source) with frequency conversion (harmonic generation).

It is a feature of this invention to reduce the interference structure obtained by the superposition or overlapping of random intensity patterns (provided by the use of DPPs even with spectrally broad pulses). In other words this feature involves reduction of the modulation produced by the interference of the beamlets on target, which persists (or is too slowly smoothed) even though the techniques discussed above are used. In accordance with the invention, the beamlets which are produced are of different frequency. Interference between the different frequencies which exist at the same time in the region of interest (on target) have been found to provide an interference pattern which decays very rapidly. There are initially, at the onset of the laser pulse on target, rapid temporal oscillations in intensity which become smaller in amplitude at a rapid rate when averaged in time; the rate being greater for a greater bandwidth of the laser pulse. A broad bandwidth pulse is utilized. The spectrum of this pulse is dispersed spatially. The interference pattern is then the result of interference of beamlets of different frequency. Rapid temporal oscillations, which rapidly decay resulting in the smoothing of the interference pattern, are obtained. Since the laser pulse is spatially dispersed, high efficiency frequency conversion (especially tripling) can be obtained by compensating for the spectral variation by using a spatially varying angle of incidence on the frequency converter with respect to the crystal axis. The spectral dispersion can be accomplished by the use of dispersive optics, preferably with a grating or gratings as the spectral disperser. The angle of incidence variation on the frequency converter crystal may be achieved by the imposition of cylindrical divergence or convergence on the beam by suitable optics.

The foregoing and other objects features and advantages of the invention as well as presently preferred embodiments thereof and the best modes now known for carrying out the invention will become more apparent from a reading of the following description in connection with the accompanying drawings described below:

FIG. 1 is a schematic diagram of a system embodying the invention.

FIG. 2 is a schematic diagram of a diffraction grating as may be used in the first grating (grating 1) of the spectral disperser shown in FIG. 1 operating in first order mode close to retroreflection and showing the incident beam on the grating and the diffracted beams at the ends of the spectrum, the largest wavelength (lowest frequency) beam being marked "red" and the beam at the upper end of the spectrum being "blue"; it being appreciated that these beams may not be actually red or blue but are separated by a frequency spread due to the bandwidth of the incident pulse, for example of about 10 Å.

FIG. 3 is a schematic diagram illustrating the spectral disperser and beam shaping and corrector optics illustrated in FIG. 1.

FIG. 3a, b, and c are cross-sectional views through the beam at different points in the beam propagation path, at points A, B and C shown in FIG. 3.

FIGS. 5a–8a are curves showing the relative intensity across the cross-section of the beam on target in a direction along the horizontal (perpendicular to the paper as shown in FIG. 1, for 1, 10, 25, and an infinite number of coherence times, respectively. (An infinite time in a practical sense is for example 50–100 picoseconds for a 1.054 um beam with a 10 Å bandwidth).

FIGS. 5b–8b are curves similiar to FIGS. 5a–8a but for a vertical cut in a direction through the beam on target that is perpendicular to the horizontal cut shown in FIGS. 5a–8a.

Figure 1:
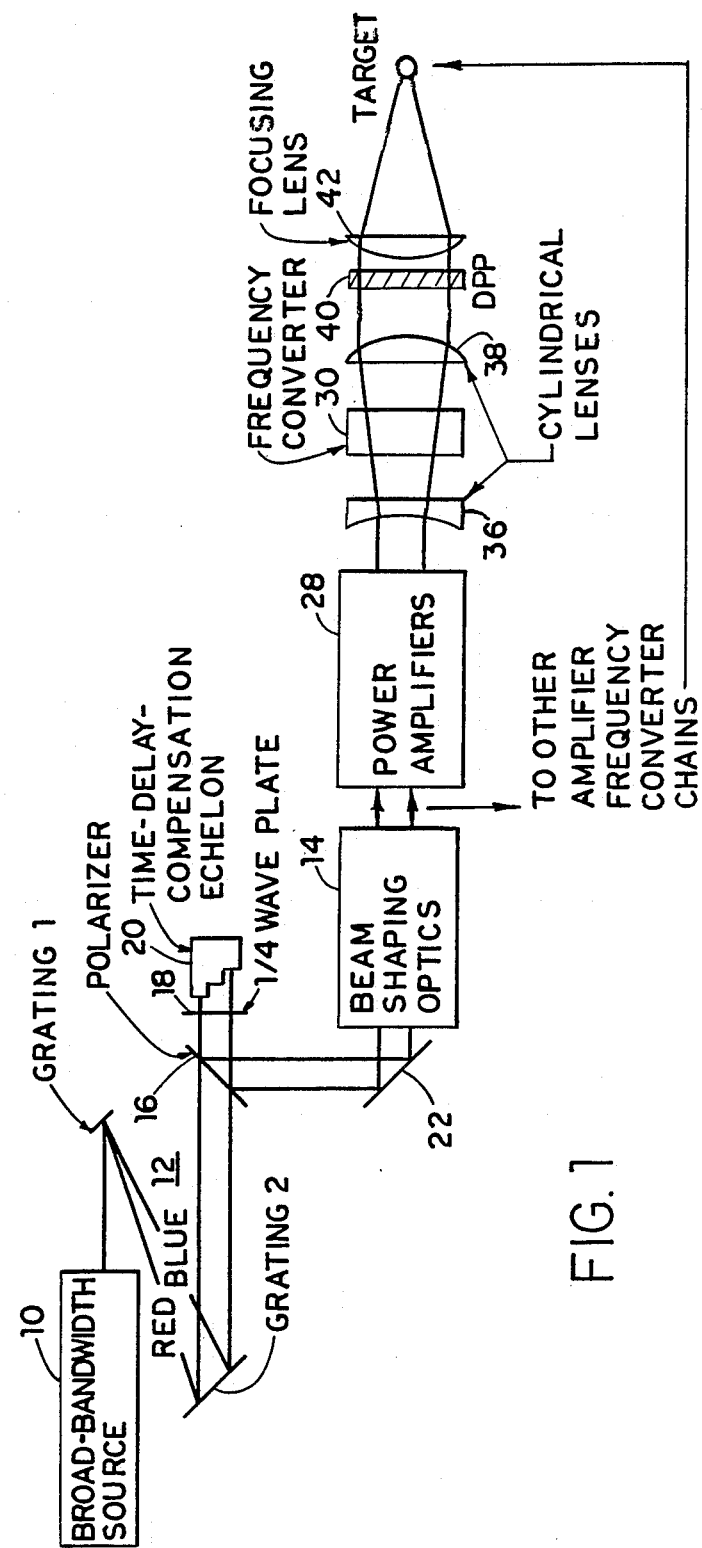

Referring to FIG. 1, there is shown a broad bandwidth laser source 10. The source can be a broadband Nd:YAG laser oscillator with beam shaping optics which provides an output beam at 1.054 $\mu$m which is short in duration, for example in the range of 100 picoseconds to 10 nanoseconds. The output beam may be obtained by selecting a portion of a longer pulse using pockels cells.

In accordance with an alternative embodiment of the invention, a spectrally broad pulse which is chirped or frequency swept over the bandwidth of interest one or more times during the pulse period may be used. Such a chirped pulse is obtained after the laser oscillator source 10 by passing the laser pulse through an electro-optic phase modulator, for example a LiTaO$_3$ crystal which is driven by a frequency swept microwave source. An optical fiber can also be used to generate a chirped pulse. Chirped pulse generation with optical fibers and optical fiber pulse compressors are described in LLE Review, Quarterly Report, Vol. 25, Oct-Dec., 1985, article entitled "Short-Pulse Amplification using Pulse-Compression Techniques", Ed. A. Schmid.

The use of both embodiments will be discussed below. The system as shown in FIG. 1 is designed to use a pulse from a broadband oscillator which includes a spectrum having the low and high ends illustrated. The spectral spread in an exemplary specific case which is quantified below is 10 Å. In the drawing the higher frequency end of the spectrum is indicated as "blue" and the lower frequency end as "red". These designations are for convenience only. The spectral range is an important factor in spectral smoothing. The period of time required for smoothing decreases as the spectral range increases.

The beam from the source 10, which may be circular in cross-section, is passed through a spectral disperser 12. This disperser is shown as having two gratings, "grating 1" and "grating 2". These gratings Produce a collimated beam which is spectrally dispersed in a direction transverse to the input beam to the disperser 12. With the gratings arranged as indicated in FIG. 1, the dispersal is in a vertical direction so that the output beam has its low frequency content at the top and its high frequency content at the bottom. The output beam is approximately of rectangular cross-section with a variation (preferably a linear variation) in wavelength along the long direction.

While spectral dispersion can be obtained with dispersive elements other than gratings, gratings are preferable since they give dispersions of greater magnitude, for example as compared to prisms. Gratings operative in transmission or reflection may be used. In the system shown in FIG. 1 reflective gratings are used, specifically linear gratings where the first order diffracts close to retro-reflection and obtains high reflectivity (diffraction efficiency). For a discussion of the design of such gratings reference may be had to E. B. Treacy, IEEE J. Quantum Electron, OE-5, 454 (1969).

Figure 2:
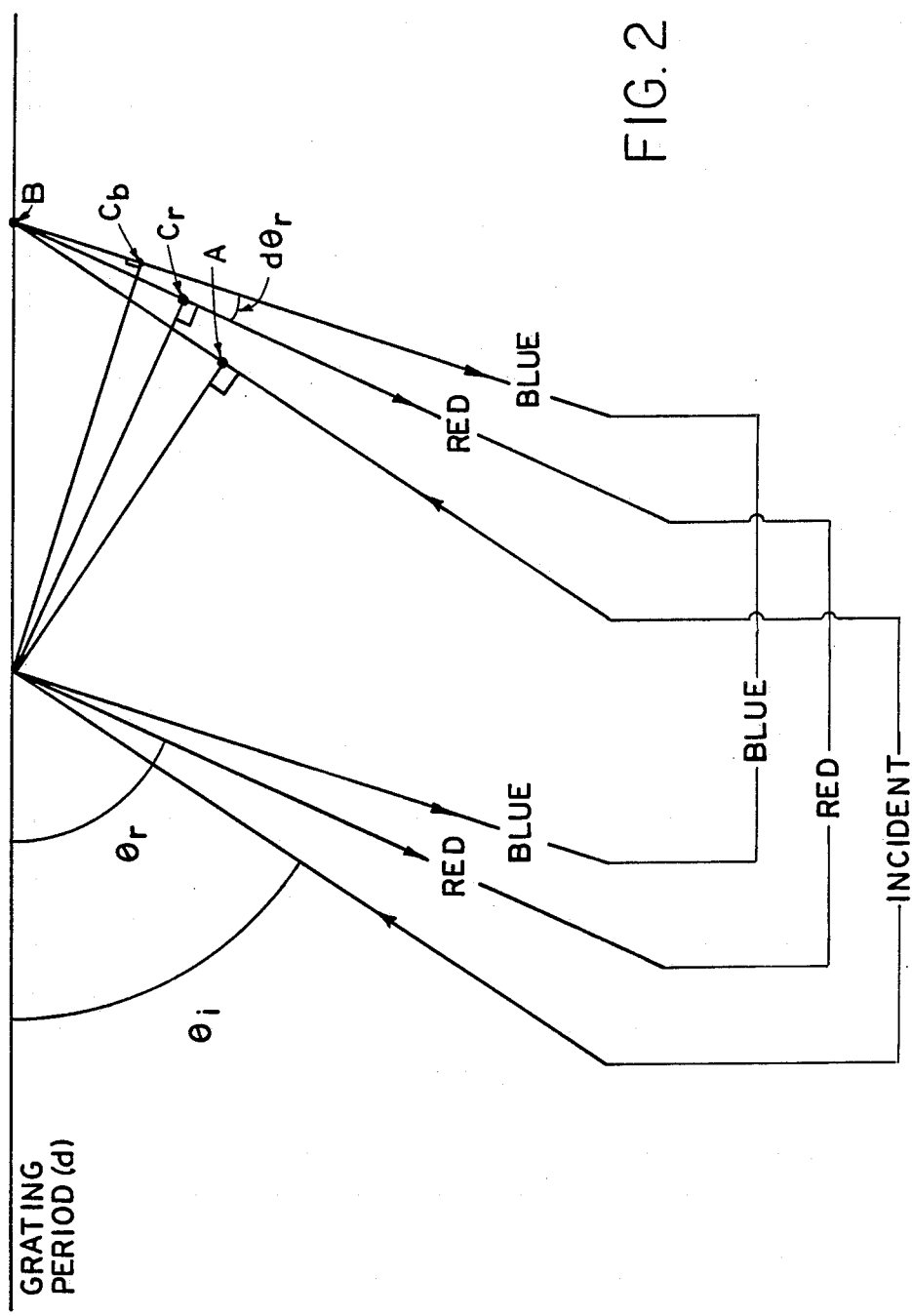

Referring to FIG. 2 the operation of grating 1 which has a periodicity (line spacing d) is shown. The incident pulse has an angle of incidence $\theta_i$, and the reflected beam is dispersed from red to blue. The red and blue ends of the spectrum are shown separately, it being understood that the wavelengths vary from red to blue over the spectrum and each individual wavelength component may be considered to propagate independently until they recombine (add) in the plane of the target (see FIG. 1) to provide the target irradiation and the interference pattern.

The grating equation relates the diffraction angle $\theta_r$ and the wavelength $\lambda$ by:

$$\lambda = d < \cos\theta_i + \cos\theta_r(\lambda) >.$$

If $\lambda = \lambda_o + \Delta\lambda$ where $\lambda_o = 2d \cos\theta_o$, $\theta_o$ being the retroangle for the central wavelength $\lambda_o$, then $$\cos\theta_r(\lambda) = \frac{\lambda(2\cos\theta_o)}{\lambda_o} - \cos\theta_i.$$

Differentiating, one obtains $$\sin\theta_r \frac{d\theta_r}{d\lambda} = \frac{2\cos\theta_o}{\lambda_o}, \tag{1}$$

so that

-continued $$d\theta_r = -a \frac{d\lambda}{\lambda_o}$$

where $a = 2 \cos \theta_o / \sin \theta_r$. For typical conditions ($d=0.588$ μm, $\lambda_o=1.054$ μm, $\theta_r \approx \theta_o = 26.38°$), this results in $a=4.033$. If $\Delta\lambda = 10$ Å (measured between the blue and red extremes), $d\theta_r = 4 \times 10^{-3}$ rad.

Referring to FIG. 3 there is shown the spectral disperser 12. The incident beam to the disperser 12 has a circular section as shown at A (see FIG. 3a); the diameter of the beam being D. In FIG. 3 the system is shown with the output beam of the disperser going directly to beam shaping optics 14. A polarizer 16, quarter wave plate 18, time delay compensation echelon 20 and mirror 22 are not used. These elements can be used for alignment of the wavelength components of the spectrally dispersed beam in time as will be discussed hereinafter. In FIG. 3 the beam shaping optics is provided by a cylindrical focusing lens 24 and cylindrical recollimating lens 26. Other optics for correction of the beam shape may be used, for example other cylindrical optics with an apodizing aperture. The double-grating spectral disperser 12 utilizes grating 1 to disperse the spectrum while grating 2 recollimates the beam so that it has a generally rectangular form as shown at B (see FIG. 3b) at the output of the disperser 12. The grating separation is L which is the distance measured along the path of the beam from grating 1 to grating 2. In an exemplary system the distance L may be greater than 7.5 meters (suitably approximately 10 meters).

Consider that the source spectrum contains wavelengths from $\lambda_o$ to $\lambda_{o+d\lambda_{max}}$, and the resulting dispersion at point B in FIG. 3b, measured in the direction y perpendicular to the beam propagation direction after the second grating (hereinafter referred to as the vertical direction) spreads the beam over a length $y_{max}$. Then $$y_{max} \approx L d\theta_r \quad (2)$$

because of operating close to retro-reflection, and the center of the spectrum at point y is given by $$\lambda(y) = \lambda_0 + (y/y_{max}) d\lambda_{max}.$$

At the point y, all wavelengths lie between $\lambda(y+D/2)$ and $\lambda(y-D/2)$, i.e., between $$\lambda_o + \frac{y}{y_{max}} d\lambda_{max} \pm \frac{D}{2y_{max}} d\lambda_{max} \quad (3)$$

or $$\lambda(y) \pm \frac{\delta\lambda}{2}$$

where $$\delta\lambda = \frac{D}{y_{max}} d\lambda_{max}.$$

Thus, the bandwidth is reduced after dispersion by the factor $y_{max}/D$, called hereinafter the spatial dispersion factor, which is the same factor by which the beam cross-section is elongated. For example, if $d\lambda_{max} = 10$ Å, $\delta\lambda = 1$ Å, and $D = 0.3$ cm, then $y_{max} = 3$ cm. The grating separation required is determined by $\delta\lambda$ and not $d\lambda_{max}$ since, from Eqs. (1)–(3)

$$\frac{D}{L} = a \frac{\delta\lambda}{\lambda_o}.$$

There is some lateral spreading (perpendicular to the beam direction) incurred due to diffraction while the beam is propagating from grating 1 to grating 2, which is not shown in FIGS. 3a–c, and which may be considered in the design of the system. In this connection, the beam diameter D spreads laterally with characteristic half-angle $\phi$ given by $\phi \neq \lambda_o/D$, and can be chosen to be sufficiently large that the added bandwidth at each point y is less than $\delta\lambda$.

After propagation through a distance L, the beam half width increases by $\neq L\phi$. In order to avoid added bandwidth at distance L, the following relationships should be satisfied:

$$L\phi < D$$

i.e., $$L\lambda_o < D^2$$

or $$\frac{D}{\lambda_o} > \frac{L}{D} = \frac{1}{a} \frac{\lambda_o}{\delta\lambda}$$

or $$D > \lambda_o^2/(a\,\delta\lambda).$$

For $\delta\lambda/\lambda \leq 10^{-4}$ and $a \approx 4$, $D > 0.25$ cm, so that the assumed $D = 0.3$ cm is just large enough. It may be desirable to increase D to say 0.5 cm to assure high spectral purity.

The double-grating spectral disperser introduces a time delay across the beam which is linearly proportional to the imposed bandwidth. From FIG. 3 it will be seen that in the case where the gratings are operated close to retroreflection the red edge of the beam is delayed relative to the blue edge by a distance given approximately by PQ+QR which is approximately equal to $$2\delta\iota = 2y_{max} \cot \theta_o \approx a\, y_{max}$$

which, in the exemplary case discussed above, ($y_{max} = 3$ cm), is 12 cm or 400 ps.

After passing through the beam corrector (the optics 24 and 26 of the beam shaping optics 14), the beam is of the shape shown at C (FIG. 3c) where the red and blue beams at the extremities of the generally vertically rectangular or square beam are elliptical due to the compression in beam corrector optics 24, 26.

The temporal beam spread may be avoided and the wavelength components which are generated at the same time put into temporal alignment by means of the time delay compensation echelon 20 (FIG. 1). The temporally displaced beam from grating 2 passes through the beam splitting polarizer 16 to the echelon 20, after going through a quarter wave delay. The echelon 20 imposes a delay which compensates for the temporal spread or delay in the gratings. After the time delay in the echelon, the reflected beam therefrom experiences another quarter wave delay so that it is reflected by the beam splitting polarizer 16. The reflected beam is again reflected by the mirror 22 and applied to the beam shaping optics 14. Then the wavelength components in the pulse are brought into temporal alignment and will reach the target plane at the same time. This improves the performance of the system, since the different wavelength components cannot interfere with each other unless they are present at the same time.

The use of the time delay compensation echelon 20 may be avoided or the time delay imposed thereon used to merely adjust or trim the temporal delays between wavelength components. At the present time, this is not preferred since it may reduce the effectiveness of smoothing on the target. Alternatively, it may be possible to use other combinations of gratings and lenses to accomplish the spatial dispersion without incurring the time delay.

After correction of beam shape in the beam shaping optics 14 (FIG. 1) the spectrally dispersed beam is propagated through power amplifiers 28. The power amplifiers are part of one or more amplifier-frequency converter chains, the beam from the beam shaping optics being split to drive each of these chains. In the OMEGA system there are 24 of such chains which illuminate the target. The power amplifiers may use laser glass and amplify the 1.054 μm beam which is spectrally spread. Since the gain bandwidth of solid state laser media, such as commonly used laser glass, is much greater than the spectral spread, the increased bandwidth can readily be accommodated.

Figure 4A:
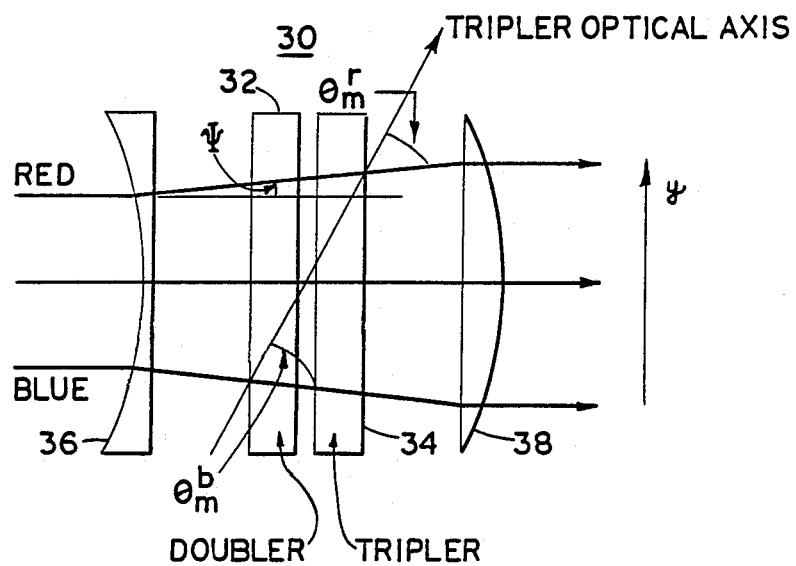
FIG. 4a is a schematic diagram illustrating in greater detail the frequency converter shown in FIG. 1.

After amplification the beams are frequency converted using a frequency converter 30 having frequency converting crystals, namely a doubler 32 and a tripler 34 as shown in FIG. 4(a). The optics vary the angle of incidence so as to obtain efficient frequency conversion for all of the wavelength components in the beam even though they are spatially dispersed. The angle of incidence variation is obtained by a weak cylindrical lens 36 ahead of the frequency converter to diverge the beam. A weak cylindrical lens 38 recollimates the beam after frequency conversion.

It is preferable to have relatively high spectral dispersion so that the bandwidth of the dispersed beam at any point is less than appropriately 1 Å. This is accomplished by approximately selecting the beam size D and grating separation L. See equations (2) and (3) above. In the specific example given with the requirement that $\delta\lambda/\lambda_o \leq 10^{-4}$, for high-efficiency frequency tripling, $D/L < 4 \times 10^{-4}$ regardless of $d\lambda_{max}$. For example, with D=0.3 cm, L>7.5 m may be suitable.

The cylindrical lens 36 corrects the phase matching angle for the shifts in wavelength across the beam. In practice the lenses 36 and 38 may be used as windows for a conversion cell. The following Table 1 summarizes the requirements imposed on beam alignment and wavelength when performing frequency tripling using two KDP crystals of equal length. Data is given for fourth harmonic generation for completeness. See, R. S. Craxton et. al., IEEE J. Quantum Electron. QE 17, 1782 (1981).

TABLE 1

Sensitivity of Conversion Crystals to Errors in Angle and Wavelength

|  | $\Delta\theta_{FWHM}$ mrad | $\Delta\lambda_{FWHM}$ Å | $\Delta\theta/\Delta\lambda$ mrad/Å | $\Delta\theta_{90}$[c] mrad | $\Delta\lambda_{90}$[c] Å |
|---|---|---|---|---|---|
| Tripler (Type II KDP)[a] | | | | | |
| 1 cm, small signal | 1.560 | 9.554 | −0.163 | 0.312 | 1.911 |
| 1.6 cm, small signal | 0.975 | 5.971 | −0.163 | 0.195 | 1.194 |
| 1.6 cm, high conversion[d][f] | 0.488 | 2.986 | −0.163 | 0.098 | 0.597 |
| Doubler (Type II KDP)[a] | | | | | |
| 1 cm, small signal | 3.207 | 154.485 | −0.021 | 0.641 | 30.897 |
| 1.6 cm, small signal | 2.004 | 96.553 | −0.021 | 0.401 | 19.311 |
| 1.6 cm, high conversion[e][f] | 2.004 | 96.553 | −0.021 | 0.401 | 19.311 |
| Quadrupler (Type I KDP)[b] | | | | | |
| 1 cm, small signal | 1.985 | 1.363 | −1.453 | 0.397 | 0.273 |

Notes
[a]Optimum operating intensities for tripling are 4 GW/cm² (1 cm doubler and tripler) and 1.5 GW/cm² (1.6 cm doubler and tripler).
[b]Frequency quadrupling may be done with thickness 0.5–1.0 cm depending on two-proton absorption constraint.
[c]$\Delta\theta_{90}$ = shift from peak which gives 90% of peak conversion. Table uses $\Delta\theta_{90} = 0.2\Delta\theta_{FWHM}$. Similarly for Δλ.
[d]Use half the small-signal values; this applies when approximately 80% overall conversion is achieved.
[e]Use small-signal values for sensitivity of overall tripling to doubler errors. This is a feature of the polarization-mismatch scheme. See R. S. Craxton, IEEE, J. Quantum Electron, QE-17, 1771 (1981).
[f]Values quoted are not greatly different between single rays and averages over a temporal Gaussian.
[g]All angles are measured in air.

In the Table the angular acceptance and bandwidth are expressed in terms of FWHM's, $\Delta\theta_{FWHM}$ and $\Delta\lambda_{FWHM}$. These quantities relate to the "tuning curves" for monochromatic, unidirectional beams propagating at varying wavelength or angle. The quantities $\Delta\theta_{FWHM}$ and $\Delta\lambda_{FWHM}$ are inversely proportional to the crystal thickness. The ratio $\Delta\theta/\Delta\lambda = n\, d\theta_m/d\lambda$, where n is the refractive index of KDP, is proportional to the rate of change of phase-matching angle $\theta_m$ with respect to λ, and is independent of crystal thickness or operating intensity.

When crystals are tuned to the phase-matching angle corresponding to a given wavelength, the quantities $\Delta\theta_{90}$ and $\Delta\lambda_{90}$ are the shifts in angle (exterior to the crystal) and wavelength that reduce the conversion efficiency to 90% of its peak value. To a good approximation, they are a factor of five smaller than the FWHM's. Near the peak of the tuning curve the relationship is close to quadratic: e.g., shifts of $\Delta\theta_{90}/3$ or $\Delta\lambda_{90}/3$ would reduce the efficiency by 1%. These values would be important for the reproducibility of a system with, say, a requirement of 1% beam balance. For tripling with 1.6-cm KDP type-II crystals, $\Delta\theta_{90} = 98$ μrad and $\Delta\lambda_{90} = 0.597$ Å. Where a broadband beam, or a beam containing large intrinsic divergence (spread of angles) is used there may be non-linear interactions between the different modes which lead to the introduction of broadening and structure to the k and ω spectra and possibly a reduction in the frequency conversion efficiency. See, R. C. Eckardt et. al., IEEE J. Quantum Electron, QE-20, 1178 (1984).

In the frequency converter shown in FIG. 4(a), at each point y (in the vertical direction) in the beam the spectrum has a peak $\lambda_o(y)$ which is a linear function of y and a width $\delta\lambda$ which is independent of y. For example, for a spatial dispersion factor $(y_{max}/D)$ of 10, a variation of $\lambda_0$ by $d\lambda_{max}=10$ Å across the beam indicates that $\delta\lambda=1$ Å, so that locally the spectrum is $\lambda_0(y)\pm 0.5$ Å. The local spectrum width is within the $\Delta\lambda_{90}$ range for the abovementioned exemplary 1.6-cm-thick crystals and provides minimum degradation of conversion. Uniform degradation across the beam apertures should result even in the presence of degradation resulting from non-linear interactions between modes as mentioned above. From Table 1 the half-angle $\Psi$ of decollimation=$0.163(d\lambda_{max}/2) = 0.815$ mrad.

The doubler tuning is unaffected by this decollimation, since the sensitive direction of the doubler is orthogonal to that of the tripler. The wavelength error incident on the doubler is $\pm 5$ Å, substantially less than the $\Delta\lambda_{90}$ applicable to the doubler (19.311 Å, from Table 1), so the doubling efficiency is not compromised.

Figure 4B:
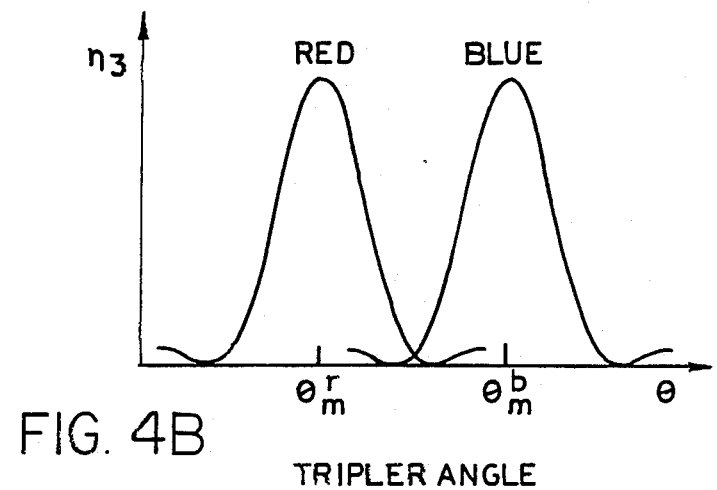
FIG. 4b is a curve showing overall third harmonic conversion efficiency, $\eta_3$ as a function of the angle $\theta$ between the beam and the tripler crystal optic axis where $\theta$ is the angle which the various wavelength components of the beam make with the tripler optical axis, $\theta_m^r$ and $\theta_m^b$ being the optimum angles for the red end and blue end components.
Figure 5A:
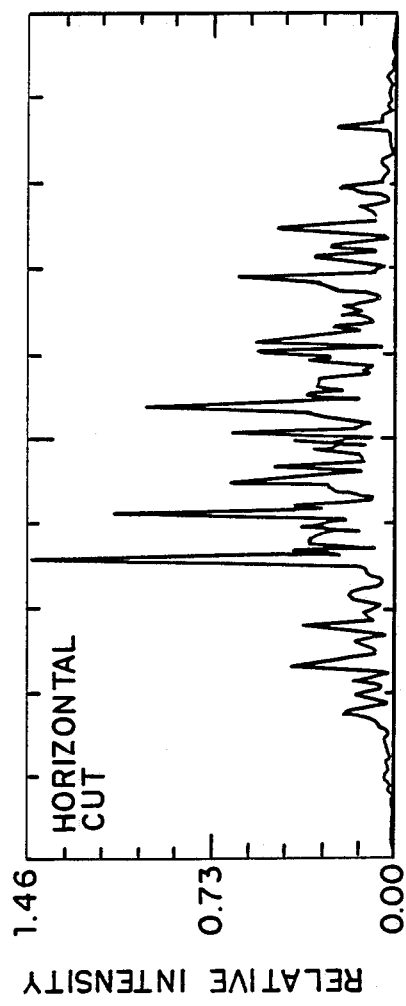
Figure 5B:
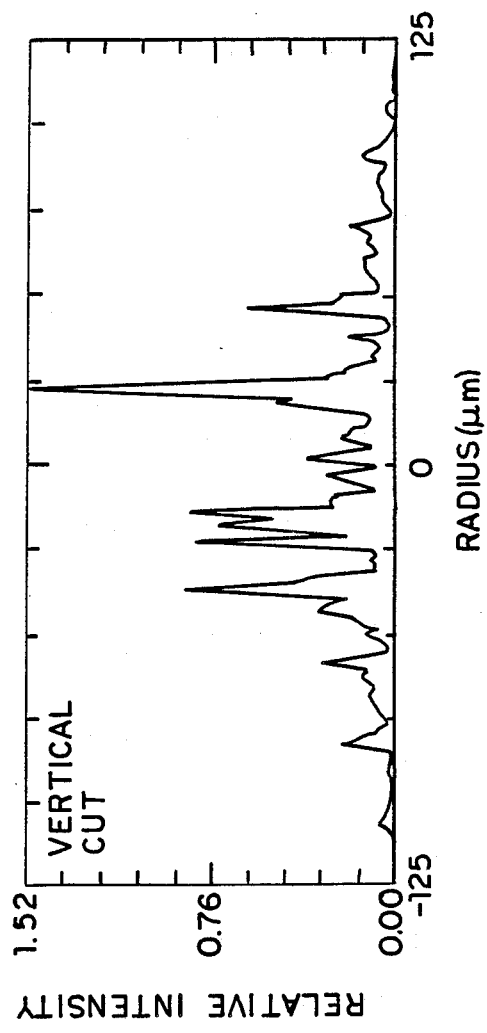

The wavelength acceptance of KDP for fourth harmonic generation is several times smaller; one would then need a much larger spatial dispersion factor to cover the same $d\lambda_{max}$ as in the tripler case. This can be done using larger values of D and L/D. It should, however, be noted that other crystal materials may exist with a larger wavelength acceptance than KDP, which property would make them more suited than KDP for fourth harmonic generation. The efficiency of conversion is shown in FIG. 4(b) and is separately maximized for each wavelength because of the variation in the vertical direction y in angle of incidence with respect to the tripler optical axis.

Returning to FIG. 1 each amplifier chain contains a distributed phase plate (DPP) or random phase mask (RPM) 40. After the mask there is used a focusing lens 42 to focus and combine the phase-incoherent portions of the beam on target. There, the interference pattern which results decays rapidly and results in a smooth beam intensity envelope. For further information as to the design of DPP's reference may be had to the article in Volume 33 of the LLE Review for October-December 1987 which article is mentioned above.

The operation of the system in beam smoothing may be better understood by considering the recombined beam which is focused on the target as having a constant near field amplitude. Then, the electric field E in the target (focal) plane, as shown in the text Born & Wolf, *Principles of Optics*, 6th Edition (Perqamon Press, New York), pages 436–437, is given by $$E(x,y) \sim \text{sinc}\frac{xd}{\lambda F} \text{sinc}\frac{yd}{\lambda F} \quad (4)$$

$$xRe \sum_{\kappa,l} \exp\left[-\frac{2\pi}{\lambda F}i(x_\kappa x + Y_l y) + i\phi_{\kappa l} + i\phi_{\kappa l}(t)\right]$$

where (k, l) refer to an individual element of the RPM, $(X_k, Y_l)$ is the center of the element measured from the beam axis, and $\phi_{kl}$ is the static phase imposed on the beam. The spatially dispersed spectrum introduces an additional phase variation across the beam which is assumed to be of the form $$\phi_{\kappa l}(t) = \omega_o t + \Delta\omega \frac{R + Y_{lt}}{2R}$$

where R is the radius of the near-field beam, and $\Delta\omega$ is the spread in frequency. It should be noted that this is a highly simplified model, since it neglects the overlap at each point on the near field of a range of Fourier components. The model applies to the case where each element of the DPP's is irradiated by monochromatic radiation whose wavelength varies linearly in the y direction.

The intensity I will vary as $|E|^2$. Separating out the phase terms and neglecting terms that vary as $2\omega_o t$, results in:

$$I(x,y,t) = I_o(x,y) \times \sum_{\substack{\kappa,l \\ m,n}}^{N} \cos\left\{-\frac{2\pi}{\lambda F}[(X_\kappa - X_m)x + \right. \quad (5)$$

$$\left. (Y_l - Y_n)y] + (\phi_{\kappa l} - \phi_{mn}) + \frac{\Delta\omega t}{2R}(Y_l - Y_n)\right\}$$

where N is the number of phase plate cells in one direction and $I_o \neq [\text{sinc}(xd/\lambda F) \text{sinc}(yd/\lambda F)]^2$. The target will respond to the time-average intensity, averaged over the characteristic hydrodynamic time scale. The average is:

$$I(x,y,t) = \frac{1}{t}\int_o^t I(x,y,t')dt' = N^2 I_o(x,y) + I_o \sum_{\substack{l \\ \kappa \neq m}} \cos\left[-\frac{2\pi}{\lambda F}(X_\kappa - X_m)x + (\phi_{\kappa l} - \phi_{ml})\right] + \quad (6)$$

$$\frac{1}{\Delta\omega t}I_o \sum_{\substack{l \neq n \\ \kappa \neq m}}\left[\frac{2R}{Y_l - Y_n}\sin\left\{-\frac{2\pi}{\lambda F}(X_\kappa - X_m)x + (\phi_{\kappa l} - \phi_{mn}) + \left(\frac{\Delta\omega t}{2R} - \frac{2\pi}{\lambda F}y\right)(Y_l - Y_n)\right\} - \right.$$

$$\left.\frac{2R}{Y_l - Y_n}\sin\left\{-\frac{2\pi}{\lambda F}[(X_\kappa - X_m)x + (Y_l - Y_n)y + (\phi_{\kappa l} - \phi_{mn})]\right\}\right]$$

The third item on the right hand side of Equation (6) is an interference term which decreases rapidly with time as $1/\Delta\omega t$. Temporal smoothing is most rapid for interference between beams produced the furthest apart $(Y_l - Y_n$ the largest), which produces the short wavelength structure. The long wavelength is reduced on a longer time scale. This is illustrated in FIGS. 5–8 which show horizontal and vertical cuts through the far-field (target-plane) beam for 1, 10, 25, and $\infty$ coherence times respectively, where the coherence time is defined to be $2\pi/\Delta\omega = 1/\nu$. For the example of a 10 Å bandwidth in the IR, the first three correspond to averaging times approximately of 1, 10, and 25 ps.

Figure 8A:
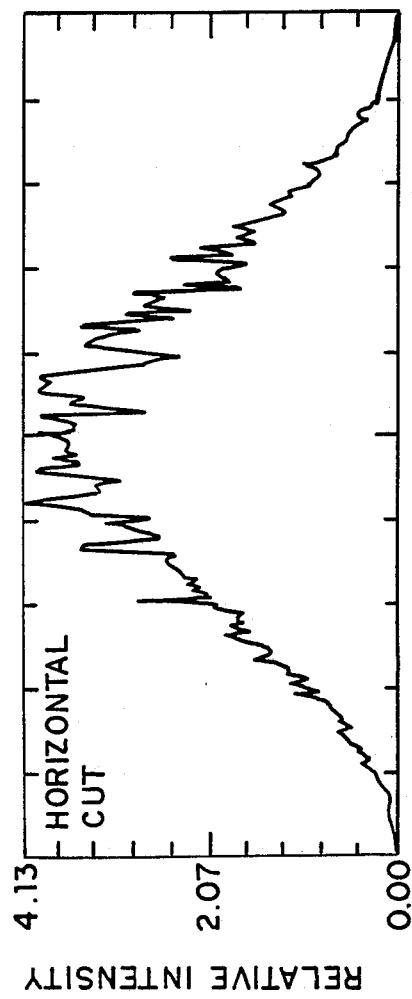
Figure 8B:
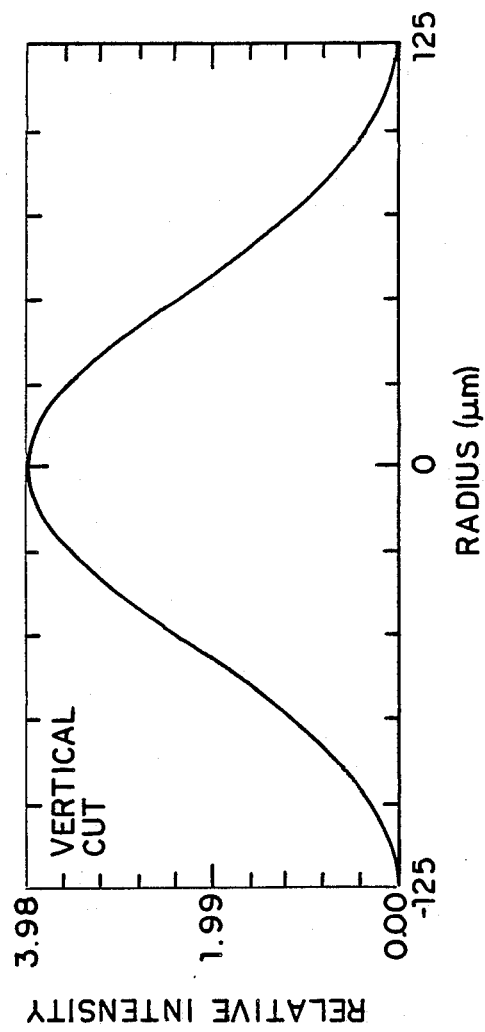

There will always be a residual interference variation along the direction perpendicular to the wavelength dispersion, as seen in FIG. 8 ($t = \infty$) and Eq. (6). The oscillations around the smooth envelope have peak-to-valley variations of about $1/\sqrt{N}$. The example in FIG. 8 uses a 100×100 phase plate, and the resultant peak-to-valley oscillations are ±5%.

In accordance with another embodiment of the invention, the wavelengths are not required to be dispersed linearly in space as was used in FIGS. 3 and 4, and, in fact, the frequencies could be randomly distributed. In this case, the lenses shown in FIG. 4 could not be used to provide the correct tripling angle for each frequency. However a diffraction grating could provide the necessary angular separation as illustrated by the first grating in FIG. 3a. Only angular dispersion is required for high efficiency tripling; it is not required that the beam propagate to further spatially separate the frequencies. If the required angular dispersion is sufficiently small that the beam can efficiently propagate through the laser and deposit an adequate amount of energy on target, then only a single grating at the beginning of the laser chain would be sufficient. If the required angular dispersion is too large, then a pair of gratings would be required; one immediately before or close to the crystals to impart the necessary angles for high-efficiency tripling and one after the crystals to recollimate the beam.

From the foregoing description it will be apparent that there has been provided improved systems for controlling the intensity and providing uniform in radiation of a target plane. Variations and modifications in the herein illustrated systems and other applications thereof, within the scope of the invention, will undoubtedly suggest themselves to those skilled in the art. Accordingly the foregoing description should be taken as illustrative and not in a limiting sense.

We claim:

1. The method of controlling intensity variation in a broad bandwidth laser beam having a plurality of frequencies which comprises the steps of propagating said beam as a spectrally dispersed beam with spatial dispersion of the frequencies thereof, and causing interference between the spatially dispersed portions of said beam of different frequency thereby temporally smoothing intensity variations in said beam.

2. The method according to claim 1 further comprising the step of converting the frequency of said spectrally dispersed beam prior to said interference causing step.

3. The method according to claim 2 wherein said converting step is carried out by directing said spectrally dispersed beam into a nonlinear optical element so that different wavelengths of said beam are incident on said element at different angles which provide optimum frequency conversion efficiency therefor.

4. The method according to claim 1 wherein said beam has a cross-section, said propagating step is carried out such that said frequencies are dispersed along a direction transverse to the cross-section of said beam.

5. The method according to claim 4 wherein said beam is propagated in a certain direction, and said propagating step is carried out such that said frequencies are in temporal alignment with each of said frequencies being present at one instant of time in a plane perpendicular to the direction of propagation of said beam.

6. The method according to claim 1 wherein said propagating step is carried out by spectrally dispersing said beam spatially in a direction transverse to the direction of propagation thereof.

7. The method according to claim 6 further comprising the step of converting the frequency of said spectrally dispersed beam prior to said interference causing step.

8. The method according to claim 6 wherein said converting step is carried out by directing said spectrally dispersed beam into a nonlinear optical element so that different wavelengths of said beam are incident on said element at different angles which provide optimum frequency conversion therefor.

9. The method according to claim 6 wherein said spectral dispersing step is carried out by directing said beam to be incident on at least one spectral dispersing element.

10. The method according to claim 6 wherein said spectral dispersing step is carried out by directing said beam to be incident upon at least a first grating and deriving said spectrally dispersed beam from said beam which is diffracted therefrom.

11. The method according to claim 10 further comprising the step of relatively delaying said portions of said beam such that different frequencies of said spectrally dispersed diffracted beam are in temporal alignment in a plane transverse to the direction of propagation of said beam.

12. The method according to claim 10 further comprising the step of directing said diffracted spatially dispersed beam to be incident upon a second grating which again diffracts said spatially dispersed diffracted beam from said first grating into an output beam in which the frequency components are spectrally dispersed in a direction transverse to the direction of propagation of the beam.

13. The method according to claim 12 further comprising the step of relatively delaying the frequency components of said output beam so that they come into temporal alignment in a plane transverse to the direction of propagation of said beam.

14. The method according to claim 13 further comprising the step of frequency converting said temporally aligned and spatially dispersed beam by directing said beam upon a nonlinear optical element at an angle which varies spatially in accordance with the spatial wavelength variation of said beam to compensate for the spatial spectral variation in said beam.

15. The method according to claim 14 wherein said converting step is carried out by varying the angle of incidence of said diffracted beam upon said element in accordance with the spatial spectral variation in said beam.

16. The method according to claim 15 wherein said angle of incidence varying step is carried out by passing said diffracted beam through a lens.

17. The method according to claim 12 further comprising the step of compensating for the spatial spectral variation in said diffracted beam by varying the angle of incidence of said diffracted beam in accordance with spatial spectral variation in said beam.

18. The method according to claim 17 wherein said angle of incidence varying step is carried out by passing said diffracted beam through a lens.

19. The method according to claim 10 further comprising the step of converting the frequency of each frequency component of said spectrally dispersed beam.

20. The method according to claim 19 further comprising the step of compensating for the spatial spectral variation in said diffracted beam.

21. The method according to claim 20 wherein said frequency converting step is carried out with at least one nonlinear optical element, and said compensating step is carried out by varying the angle of incidence of said diffracted beam on said element in accordance with spatial spectral variation in said beam.

22. The method according to claim 21 wherein said angle of incidence varying step is carried out by passing said diffracted beam through a lens.

23. The method according to claim 1 wherein said interference causing step is carried out by forming said beam into a multiplicity of portions which overlap each other at a region in a plane.

24. The method according to claim 1 wherein said interference causing step is carried out by combining said spectrally dispersed portions of said beam.

25. The method according to claim 24 wherein said combining step is carried out by varying at least some of said portions in phase with respect to others of said portions and focusing said portions in a region of a plane.

26. The method according to claim 25 wherein said phase varying step is carried out by passing the said spectrally dispersed beam through a distributed phase plate (DPP).

27. A system for controlling intensity variation in a broad bandwidth laser beam having a plurality of frequencies which comprises means for propagating said beam as a spectrally dispersed beam with spatial dispersion of frequencies thereof, and means upon which said spectrally dispersed beam is incident causing interference between spatially dispersed portions of said beam of different frequency thereby temporally smoothing intensity variations in said beam.

28. The system according to claim 27 further comprising means for converting the frequency of said spectrally dispersed beam prior to said beam being incident upon said interference causing means.

29. The system according to claim 28 wherein said converting means includes a nonlinear optical element upon which different wavelengths of said beam are incident at different angles which provide optimum frequency conversion efficiency therefor.

30. The system according to claim 27 wherein said propagating means comprises means for spectrally dispersing said beam spatially in a direction transverse to the direction of propagation thereof.

31. The system according to claim 30 further comprising means for converting the frequency of said spectrally dispersed beam prior to said beam being incident upon said interference causing means.

32. The system according to claim 30 wherein said converting means comprises a non-linear optical element means for directing said spectrally dispersed beam into said nonlinear optical element so that different wavelengths of said beam are incident on said element at different angles which provide optimum frequency conversion therefor.

33. The system according to claim 30 wherein said spectral dispersing means comprises at least a first grating upon which said laser beam is incident, and means for deriving said spectrally dispersed beam from said beam which is diffracted therefrom.

34. The system according to claim 33 further comprising a second grating, and means for directing said diffracted spatially dispersed beam to be incident upon said second grating which again diffracts said spatially dispersed diffracted beam from said first grating into an output beam in which the frequencies are spectrally dispersed in a direction transverse to the direction of propagation of the beam.

35. The system according to claim 31 further comprising means for converting the frequency of each frequency component of said spectrally dispersed beam.

36. The system according to claim 35 further comprising means for compensating for the spatial spectral variation in said diffracted beam.

37. The system according to claim 36 wherein said frequency converting means comprises at least one nonlinear optical element, and said compensating means comprises means for varying the angle of incidence of said diffracted beam on said element in accordance with spatial spectral variation in said beam.

38. The system according to claim 37 wherein said angle of incidence varying means comprises a lens through which said diffracted beam passes.

39. The system according to claim 35 further comprising means for relatively delaying the frequency components of said output beam so that they come into temporal alignment in a plane transverse to the direction of propagation of said beam.

40. The system according to claim 39 further comprising a non-linear optical element, and means for frequency converting said temporally aligned and spatially dispersed beam by directing said beam upon said non-linear optical element at an angle which varies spatially in accordance with the spatial wavelength variation of said beam to compensate for the spatial spectral variation in said beam.

41. The system according to claim 40 wherein said converting means includes means for varying the angle of incidence of said diffracted beam upon said element in accordance with the spatial spectral variation in said beam.

42. The system according to claim 41 wherein said angle of incidence varying means comprises a lens through which said diffracted beam passes.

43. The system according to claim 27 wherein said interference causing means comprises means for forming said beam into a multiplicity of portions which overlap each other at a region in a plane.

44. The system according to claim 27 wherein said interference causing means comprises means for combining said spectrally dispersed portions of said beam at a target plane.

45. The system according to claim 44 wherein said combining means comprises means for varying the phase of at least some of said portions with respect to others of said portions and focusing said portions in a region of said plane.

46. The system according to claim 45 wherein said phase varying means comprises a distributed phase plate (DPP) through which said spectrally dispersed beam passes.

47. The method of converting the frequency of a broad bandwidth laser beam having a plurality of frequencies which comprises the steps of propagating said beam as a spectrally dispersed beam with spatial dispersion of the frequencies thereof, and directing said spectrally dispersed beam into a nonlinear optical element so that different wavelengths of said beam are incident on said element at different angles which provide optimum frequency conversion efficiency therefor.

48. The method according to claim 47 wherein said spectral dispersing step is carried out by directing said beam to be incident on at least one spectral dispersing element.

49. The method according to claim 48 wherein spectral dispersing step is carried out by directing said beam to be incident upon at least a first grating and deriving said spectrally dispersed beam from said beam which is diffracted therefrom.

50. The method according to claim 48 further comprising the step of directing said diffracted spatially dispersed beam to be incident upon a second grating which again diffracts said spatially dispersed diffracted beam from said first grating into an output beam in which the frequency components are spectrally dispersed in a direction transverse to the direction of propagation of the beam.

* * * * *